(12) United States Patent
Ahmed et al.

(10) Patent No.: US 7,002,930 B2
(45) Date of Patent: Feb. 21, 2006

(54) METHOD OF OPTIMAL POWER DISTRIBUTION FOR COMMUNICATION SYSTEMS

(75) Inventors: Nadeem Ahmed, Houston, TX (US); Donald Phillip Shaver, Dallas, TX (US); Arthur Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 894 days.

(21) Appl. No.: 09/999,558

(22) Filed: Oct. 19, 2001

(65) Prior Publication Data

US 2002/0118652 A1   Aug. 29, 2002

Related U.S. Application Data

(60) Provisional application No. 60/254,729, filed on Dec. 11, 2000.

(51) Int. Cl.
*H04B 3/20* (2006.01)

(52) U.S. Cl. .................. 370/286; 370/201; 375/296; 375/346; 379/416; 379/417

(58) Field of Classification Search .............. 370/286, 370/201, 268, 289, 318, 465, 468; 375/219, 375/220, 222, 254, 260, 285, 296, 297, 346; 379/416, 417, 93.01, 93.06, 93.07; 455/63.1
See application file for complete search history.

(56) References Cited

U.S. PATENT DOCUMENTS 5,377,230 A * 12/1994 Golden ..................... 375/296
5,483,551 A * 1/1996 Huang et al. ............... 375/219
6,160,790 A * 12/2000 Bremer ...................... 370/201
6,266,347 B1 * 7/2001 Amrany et al. ............. 370/478
6,292,559 B1 * 9/2001 Gaikwad et al. ............ 379/417
6,317,495 B1 * 11/2001 Gaikwad et al. ............ 379/417
6,807,228 B1 * 10/2004 Agazzi et al. ............... 375/232
6,839,429 B1 * 1/2005 Gaikwad et al. ............ 379/417
6,898,281 B1 * 5/2005 Larsson et al. ......... 379/406.06
2002/0196747 A1 * 12/2002 Agazzi ....................... 370/286

FOREIGN PATENT DOCUMENTS

EP    0 955 744 A2    11/1999

OTHER PUBLICATIONS

Gaikwad, Rohit V., et al., "Spectral Optimization for Commmunication in the Presence of Crosstalk," XP-002189277, Nov. 15, 1999, pp. 1-6.

* cited by examiner

*Primary Examiner*—Ajit Patel
*Assistant Examiner*—Chirag Shah
(74) *Attorney, Agent, or Firm*—Abdul Zindani; W. James Brady, III; Frederick J. Telecky, Jr.

(57) ABSTRACT

A method of optimally distributing signal power for multiple users over a xDSL or wireless channel considers uses computationally efficient tools to achieve improved crosstalk avoidance. The method chooses between EQPSD and FDS signaling in a fashion that maximizes overall data rate. Rather than choosing EQPSD signaling in regions where there is low self-NEXT, but where the echo is high (relative to signal power), the method selects FDS signaling since the communication system acts in a manner similar to self-NEXT in such regions.

6 Claims, 10 Drawing Sheets

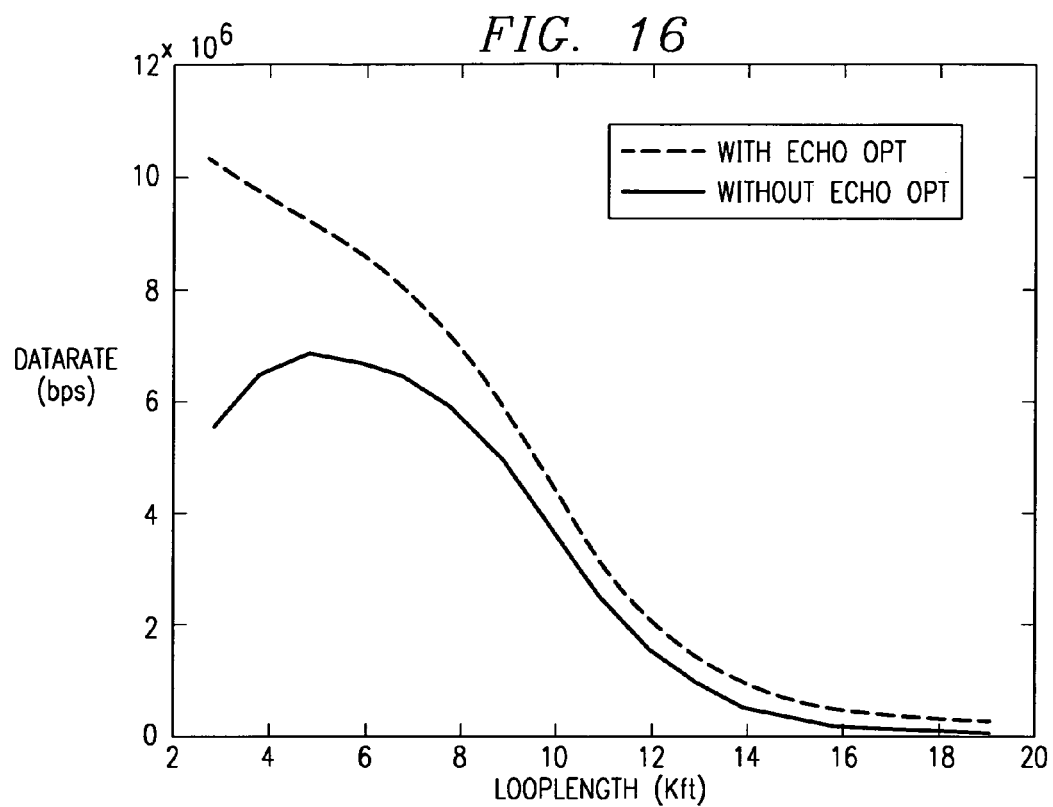
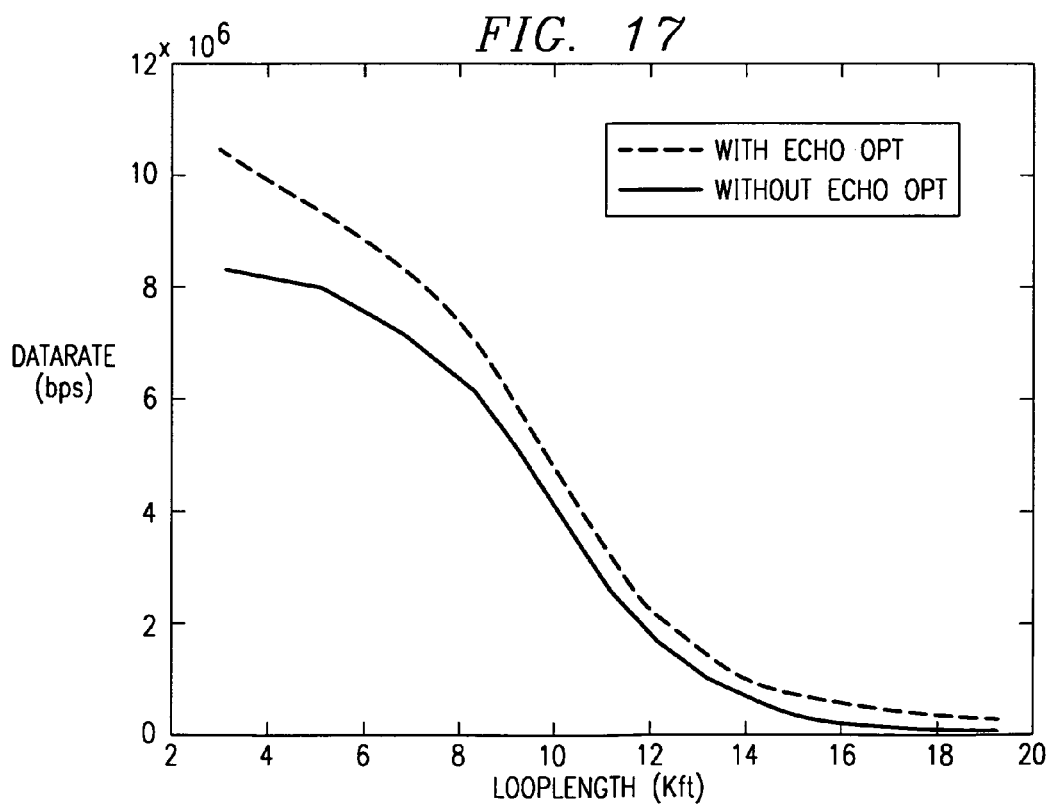

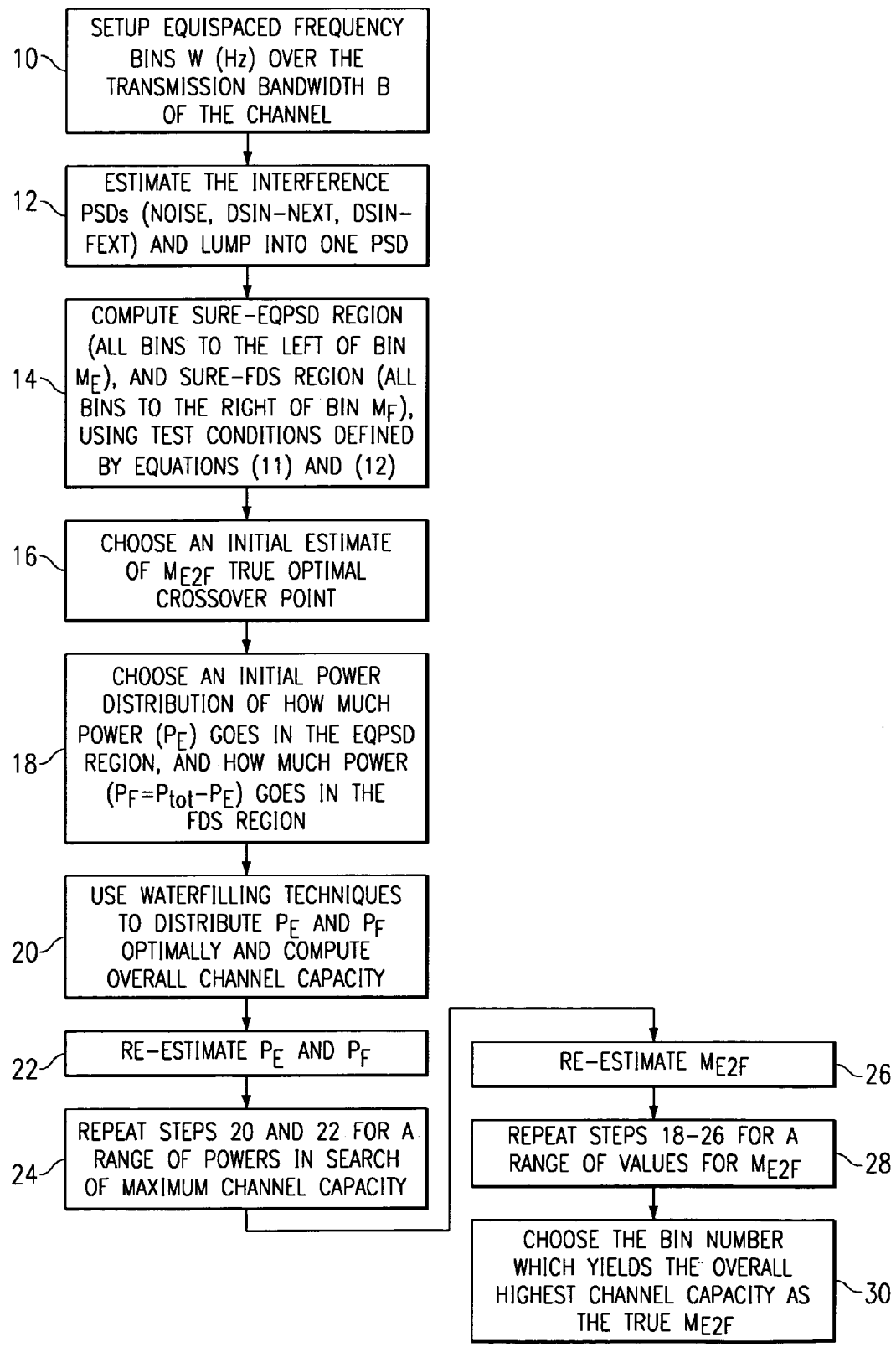

METHOD OF OPTIMAL POWER DISTRIBUTION FOR COMMUNICATION SYSTEMS

This application claims priority under 35 USC § 119 (e)(1) of Provisional Application No. 60/254,729, filed Dec. 11, 2000.

BACKGROUND OF THE INVENTION

1. Field of the Invention

This invention relates generally to power distribution methods for communications systems, and more particularly to a method of optimal power distribution in the presence of communication system crosstalk and imperfect echo cancellation.

2. Description of the Prior Art

Many communication systems rely on significant resource-sharing among multiple users, often transmission bandwidth. Proximity of different paths or channels between users can then lead to multi-user interference or crosstalk, such as the crosstalk between digital subscriber lines (DSLs) in a telephone cable or users in a wireless channel. Crosstalk lowers channel capacities and can severely limit achievable bit rates.

To achieve higher transmission speeds, a digital subscriber loop (DSL) eliminates the 3400 Hz upper bound on frequencies and uses a much broader range than the traditional voice channel. Crosstalk is a significant problem associated with high frequencies. The energy of the modulated signal radiates into adjacent copper wires in the same cable binder. Significant crosstalk is created when systems within the same cable binder, transmit information over the same range of frequencies. Crosstalk is typically categorized in one of two forms including Near End Crosstalk (NEXT) and Far End Crosstalk (FEXT). NEXT refers to interference between neighboring lines that arise when signals are transmitted in opposite directions. FEXT refers to interference between neighboring lines that arises when signals are transmitted in the same direction. FIG. 1 illustrates NEXT and FEXT between neighboring lines. NEXT, typically causes more interference, as FEXT is also attenuated as the signal propagates the length of the line.

Interference can be further subdivided into self-interference, and interference from other services. Self-interference, herein after referred to as self-NEXT and self-FEXT, refers to that which is generated by lines carrying the same service, i.e. other DSL modems carrying the same service. Interference from other sources is herein after referred to as DSIN-NEXT and DSIN-FEXT.

FIG. 2 illustrates the channel, self-NEXT and self-FEXT transfer functions, denoted by $H_C(f)$, $H_N(f)$, and $H_F(f)$, respectively, associated with an atypical DSL channel. The magnitude squared frequency response for the $i^{th}$ line is respectively defined as:

$$|H_C(f)|^2 = \begin{cases} H_{i,k} & \text{if } |f - f_k| \le W/2, \\ 0 & \text{otherwise;} \end{cases} \quad (1)$$

$$|H_N(f)|^2 = \begin{cases} H_{i,k} & \text{if } |f - f_k| \le W/2, \\ 0 & \text{otherwise;} \end{cases} \text{ and} \quad (2)$$

$$|H_F(f)|^2 = \begin{cases} H_{i,k} & \text{if } |f - f_k| \le W/2, \\ 0 & \text{otherwise.} \end{cases} \quad (3)$$

where $f_k$ are the center frequencies of the N bins with index $k \in \{1, 2, \ldots, N\}$. The number of bins, N, is chosen such that all the channel, NEXT and FEXT transfer functions are relatively constant within each bin, such as depicted within each region 200 in FIG. 2.

Previous work at Rice University by Richard Baraniuk, Rohit Gaikwad and Nadeem Ahmed have addressed optimal power distribution for communications in the presence of crosstalk. That work considers the interference factors discussed herein above, and provides an optimal signaling spectra. The solution provided by Baraniuk et al. has an echo cancelled region and a frequency division signaling region. In the echo cancelled region, echo cancellers are used extensively to remove echo which disrupts performance. The work of Baraniuk et al. did not factor into the optimization process, the capabilities of practical echo cancellers which do not have perfect echo rejection capabilities, but instead assumed that these practical echo cancellers do have perfect echo rejection capabilities.

The problematic effects of imperfect echo cancellers can be addressed by first letting $E_k$ denote the residual echo (after echo cancellation) as a fraction of total power in bin k. The total residual echo is then $E_n P_n$. Further, the interference from other services, DSIN-NEXT, DSIN-FEXT and the additive Gaussian noise are next lumped into one noise term, N(f). Exploring the problematic effects of imperfect echo cancellers is next set forth herein after with reference to the following terms defined below wherein:

Channel capacity is conventionally defined as the maximum transmission rate (bits per second) that can be transmitted over a channel with an arbitrarily small bit-error rate (BER).

Power Spectral Density (PSD) is the distribution of signal energy over frequency. The maximum allowable PSD for a service in the presence of any interference combination is known as a PSD mask. The transmit spectrum for a service is the PSD of the transmitted signal.

In view of the foregoing, a need exists for a technique to maximize the capacity of users that are utilizing a service 'A'; while minimizing the performance degradation of other services for an arbitrary DSL communications channel subject to 1) self-interference from other users of service 'A' (self-NEXT, self-FEXT), 2) interference from users of other services (DSIN-NEXT, DSIN-FEXT), 3) interference from service 'A' into other services, and 4) other interference including noise. NEXT, as stated above, is the dominant interference in DSL service. One simple way to eliminate self-NEXT is to use orthogonal signaling. This could be in the form of Time Division Signaling (TDS), Frequency Division Signaling (FDS), or Code Division Signaling (CDS). FDS has been shown to be the optimal signaling technique when subject to a power constraint. Self-NEXT can be eliminated using FDS, for example, by forcing upstream and downstream transmitters to use disjoint frequency bands. The resulting upstream and downstream transmissions are orthogonal and can be easily separated by their respective receivers. Moving to an FDS scheme, however, reduces the bandwidth available to each transmitter by one-half of the original bandwidth. Although FDS eliminates self-NEXT, increasing capacity, this feature is achieved at the cost of reduced bandwidth, that decreases capacity, resulting in a tradeoff. When self-NEXT is not high enough to warrant use of FDS therefore, both upstream and downstream transmitters should have the same spectrum. This is referred to as Equal PSD (EQPSD, or Echo Cancelled) signaling. The need for a technique to maximize the capacity of users that are utilizing a service 'A', while minimizing the performance degradation of other services for an arbitrary DSL communications channel should therefore, also take the noise environment into account when distributing power by using joint optimization techniques.

SUMMARY OF THE INVENTION

The present invention is directed to a method to optimally allocate bandwidth among multiple users of a digital subscriber line (DSL) in a telephone cable or among multiple users in a wireless channel. The method uses computationally efficient tools that are developed to achieve improved crosstalk avoidance. Specifically, the imperfect echo cancellation capabilities of practical XDSL systems are considered to achieve an optimization scheme that significantly outperforms known spectral optimization schemes for communication in the presence of crosstalk. The present method chooses between EQPSD and FDS signaling in a fashion that maximizes overall data rate. In regions where self-NEXT is high, capacity is increased by cutting the bandwidth in half, and using FDS signaling, otherwise using the full bandwidth and using EQPSD signaling in regions where self-NEXT is not high. The spectra of xDSL environments with shorter loop lengths are characterized by larger EQPSD regions than those with longer loop lengths. EQPSD to FDS crossover points generally occur at higher tones for shorter loop lengths. When the echo becomes increasingly small, both techniques converge to the same spectra. This is because echo has a smaller effect on system performance here, and does not hurt performance as much as it normally would in the EQPSD regions. Rather than choosing EQPSD signaling in regions where there is low self-NEXT, but where the echo is high (relative to signal power), the present method selects FDS signaling, since the present inventors have determined that the residual echo in the system acts in a manner similar to self-NEXT.

In situations where echo canceller performance is poor enough to swamp out the self-NEXT transfer function, FDS signaling is seen almost exclusively. Echo cancellation hardware is not used in such situations, since system performance is not enhanced. Instead, the present method employs a modified waterfilling solution.

According to one embodiment, predetermined test conditions are used to find the regions of the spectrum that will surely use EQPSD and FDS signaling. All bins to the left of crossover bin $M_E$ will use EQPDS signaling, while all bins to the right of crossover bin $M_F$ will use FDS signaling. The signaling schemes for the bins in the region $(M_E, M_F)$ are determined via a waterfilling technique in order to determine the true optimal crossover point, $(M_{E2F})$, from EQPDS to FDS signaling.

In one aspect of the invention, a computationally efficient method is implemented to provide a crosstalk avoidance scheme that optimally allocates bandwidth among multiple users of digital subscriber lines in a telephone cable or multiple users of a wireless channel.

In another aspect of the invention, a method of crosstalk avoidance considers imperfect echo cancellation capabilities associated with practical communications systems to achieve optimal distribution of power over frequency for a given configuration of users and echo cancellation capability to maximize data rates.

In yet another aspect of the invention, a method of crosstalk avoidance provides justification for implementing a purely Frequency Division Duplexed system that does not incorporate any costly echo cancellers where the method cannot provide a minimum level of performance.

In still another aspect of the invention, a method is implemented to maximize the capacity of users that are utilizing a service 'A', while minimizing the performance degradation of other services for an arbitrary DSL communications channel subject to 1) self-interference from other users of service 'A' (self-NEXT, self-FEXT), 2) interference from users of other services (DSIN-NEXT, DSIN-FEXT), 3) interference from service 'A' into other services, and 4) other interference including noise.

BRIEF DESCRIPTION OF THE DRAWINGS

Other aspects, features and attendant advantages of the present invention will be readily appreciated as the same become better understood by reference to the following detailed description when considered in connection with the accompanying drawings wherein:

FIGS. 15–19 are graphs illustrating the differences in upstream and downstream data rate performance versus loop length between the present optimization method and one known method of spectral optimization in the presence of 10 self interferers and 10 HDSL NEXT interferers; and FIG. 20 is a flow chart illustrating a method implementing optimal power distribution in the presence of crosstalk and imperfect echo cancellation for a DSL or wireless channel according to one embodiment of the present invention.

While the above-identified drawing figures exemplify characteristics associated with particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
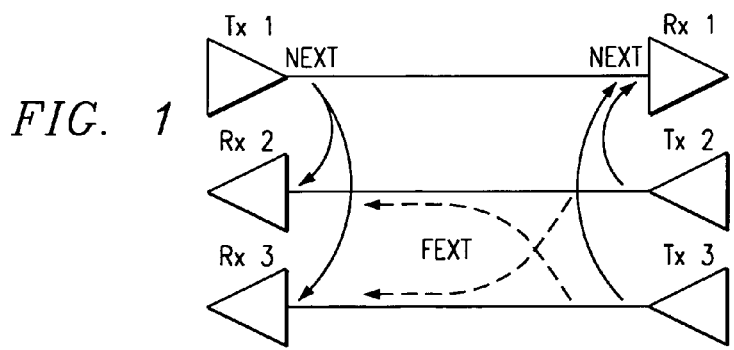
FIG. 1 illustrates Near End Crosstalk and Far End Crosstalk between neighboring digital subscriber lines in a telephone cable or multiple users of a wireless channel.
Figure 2:
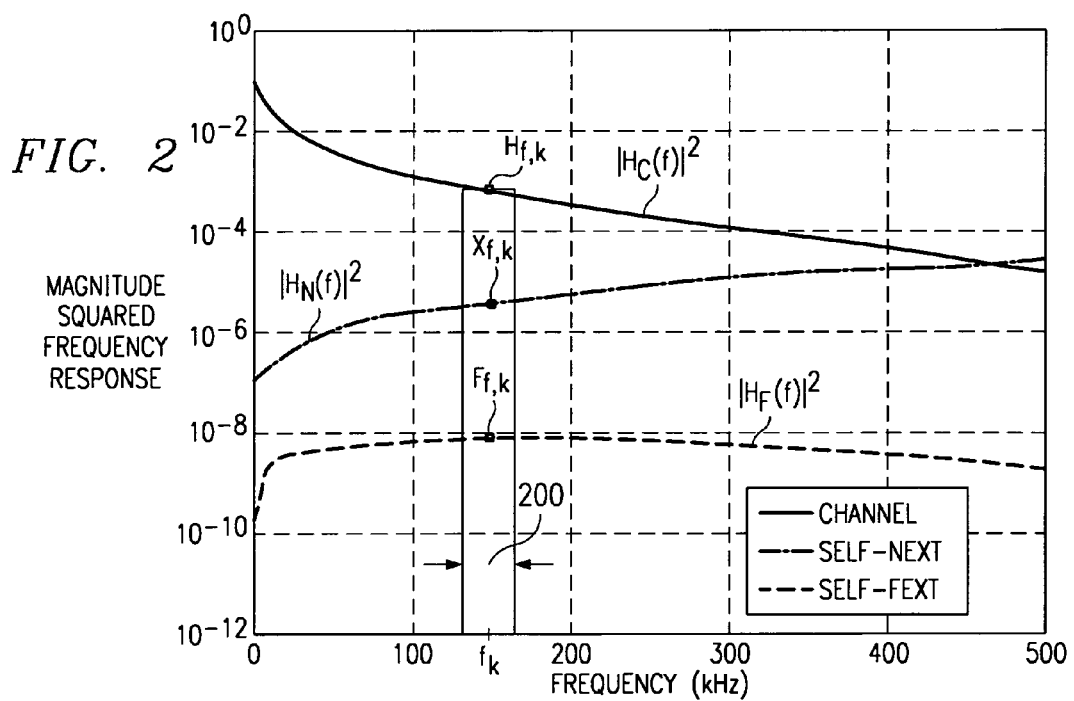
FIG. 2 illustrates channel, NEXT and FEXT transfer functions for an arbitrary DSL channel.

The present capacity maximizing method is best understood by considering a communication channel that is band-limited to bandwidth B. The frequency range is then divided into N equal width bins, such that the channel, NEXT and FEXT transfer functions are relatively constant, such as discussed herein before with reference to FIG. 2. The present capacity maximizing method can be used to determine what signaling scheme to use and the amount of power to place in each of the N bins. One embodiment maximizes the sum of the upstream and downstream capacities subject to a total power constraint $P_{tot}$. Recognizing that the severity of self-NEXT varies with frequency in a typical telephone channel, the present inventors recognized that switching between FDS and EQPSD signaling as warranted by the severity of the self-NEXT, would yield maximum channel capacity. A description of the present capacity maximizing method is best understood by considering one embodiment in which $s^u(f)$ and $S^d(f)$ denote the PSD in a particular bin in the upstream and downstream direction, respectively.

$$s^u(f) = \begin{cases} \alpha 2\frac{P}{W} & \text{IF } 0 \le f \le \frac{W}{2} \\ (1-\alpha)2\frac{P}{W} & \text{IF } \frac{W}{2} < f \le W \\ 0 & \text{otherwise} \end{cases} \quad (4)$$

$$s^u(f) = \begin{cases} (1-\alpha)2\frac{P}{W} & \text{IF } 0 \le f \le \frac{W}{2} \\ \alpha 2\frac{P}{W} & \text{IF } \frac{W}{2} < f \le W \\ 0 & \text{otherwise} \end{cases} \quad (5)$$

Figure 3:
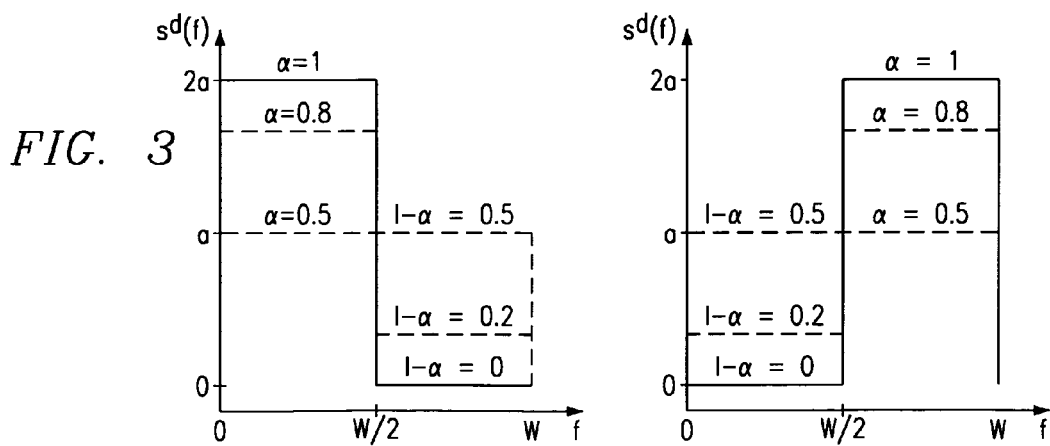
FIG. 3 illustrates all possible combinations of signaling schemes in a typical telephone channel that employs switching between FDS and EQPSD as warranted by the severity of self-NEXT.

FIG. 3 illustrates all possible combinations of signaling schemes in terms of $s^u(f)$ and $s^d(f)$ for a typical telephone channel that employs switching between FDS and EQPSD as warranted by the severity of self-NEXT. It can be seen, for example, that when $\alpha=0.5$, then $s^u(f)=s^d(f)$. This situation corresponds to EQPSD signaling, as discussed herein before. Alternatively, when $\alpha=1$, $s^u(f)$ and $s^d(f)$ are disjoint, corresponding to FDS signaling. It can be appreciated that since the upstream and downstream signaling schemes are symmetric, one need only maximize the data rate in one direction of transmission. Then, realizing that the residual echo affects performance in a manner similar to NEXT, the total channel capacity in the upstream direction can be written as $$C^u = \qquad (6)$$

$$\frac{B}{2\ln(2)}\left\{\ln\left[1+\frac{\alpha\frac{2Pn}{B}Hn}{Nn+(1-\alpha)\frac{2Pn}{B}Xn+\alpha\frac{2Pn}{B}Fn+(1-\alpha)\frac{2Pn}{B}En}\right] + \ln\left[1+\frac{(1-\alpha)\frac{2Pn}{B}Hn}{Nn+\alpha\frac{2Pn}{B}Xn+(1-\alpha)\frac{2Pn}{B}Fn+\alpha\frac{2Pn}{B}En}\right]\right\}$$

Taking the derivative of equation (6) with respect to cc produces equation (7) that is written as $$\frac{dC^u}{d\alpha} = G_n(2\alpha-1)\{2([X_n+E_n]-F_n) + \qquad (7)$$
$$G_n(([X_n+E_n]^2-F_n^2)-H_n(1+G_nF_n)\}L$$
$$= 0$$

where L>0 and $$G_n = \frac{2P_n}{B}.$$

Since the function $C^u(\alpha)$ is monotonic in the interval $\alpha \in [0.5,1]$, a single stationary point at $\alpha=0.5$ can be scrutinized to determine if it is a maximum. Then, if the single stationary point at $\alpha=0.5$ is a maximum, it is optimal to use EQPSD for the two directions of transmission. It can be shown that for all $\alpha>0.5$, $$\frac{dC^u}{d\alpha}$$

will be negative if and only if $$2([X_n+E_n]-F_n)+G_n([X_n+E_n]^2-F_n^2)-H_n(130\ G_nF_n)<0 \qquad (8)$$

This implies that $\alpha=0.5$ is a maximum if and only if $$G_n < \frac{H_n-2[X_n+E_n-F_n]}{(X_n+E_n)^2-F_n^2-H_nF_n} \qquad (9)$$

Similarly, $\alpha=1$ is a minimum if and only if $$G_n > \frac{H_n-2[X_n+E_n-F_n]}{(X_n+E_n)^2-F_n^2-H_nF_n} \qquad (10)$$

In view of the above, it then follows that $$G_n = \frac{2P_n}{N_nB} \overset{EQPSD}{>} \frac{H_n-2[X_n+E_n-F_n]}{(X_n+E_n)^2-F_n^2-H_nF_n} \qquad (11)$$

and $$G_n = \frac{2P_n}{N_nB} \overset{FDS}{<} \frac{H_n-2[X_n+E_n-F_n]}{(X_n+E_n)^2-F_n^2-H_nF_n} \qquad (12)$$

if $(X_n+E_n)^2-F_n^2-H_nF_n<0$, and with the inequalities reversed, if $(X_n+E_n)^2-F_n^2-H_nF_n>0$. These test conditions can then be used to find the regions of the spectrum that will surely use EQPSD and FDS signaling. It can then be shown that all bins to the left of crossover bin $M_E$ use EQPDS signaling and that all bins to the right of crossover bin $M_F$ use FDS signaling. The signaling schemes for the bins in the region ($M_E$, $M_F$) cannot be determined using these same test conditions; and the true optimal crossover point from EQPSD to FDS signaling, $M_{E2F}$, lies somewhere in between. In order to determine the true optimal crossover point $M_{E2F}$, the present inventors first applied waterfilling techniques described herein below in association with the EQPDS and FDS regions.

Distribution of Power in the EQPSD Region

Since both upstream and downstream spectra are using the same frequency band in this region, Echo, NEXT and FEXT, along with Gaussian noise, limit the channel performance. To determine the best possible distribution of power over frequency in this region, the present inventors considered the capacity formula for parallel independent channels written as $$C = \sum_{n=1}^{N} \frac{W}{2N} \ln\left(1 + \frac{P_n H_n}{w_n + P_n F_n + P_n X_n + P_n E_n}\right) \quad (13)$$

where $P_n$ is the input power within a particular subchannel, $H_n$ is the power transfer gain, $X_n$ and $F_n$ are the self-NEXT and self-FEXT transfer functions, and $E_n$ is the echo (as a fraction of the input power. The power distribution importantly must also conform to the power constraint defined by equation (14) that is written as $$\sum_{n=1}^{N} P_n = P_{tot} \quad (14)$$

Maximizing the channel capacity can then be determined as an optimization problem wherein the above power constraint can be incorporated with a Lagrange multiplier in a fashion familiar to those skilled in the art of optimization theory and techniques. The process begins by writing the functional J as $$J = \sum_{n=1}^{N} \frac{W}{2N} \ln\left(1 + \frac{P_n H_n}{w_n + P_n F_n + P_n X_n + P_n E_n}\right) - \lambda\left(\sum_{n=1}^{N} P_n - P_{tot}\right) \quad (15)$$

Differentiating equation (15) with respect to $P_n$ then produces $$\frac{dJ}{dP_n} = \frac{W}{2N} H_n \frac{w_n}{[w_n + P_n(F_n + X_n + E_n + H_n)][w_n + P_n(F_n + X_n + E_n)]} - \lambda = 0 \quad (16)$$

Rearranging and substituting equations (17) and (18) written as $$P_n = \frac{S_n W}{2N} \quad (17)$$

$$w_n = \frac{\sigma^2 W}{2N} \quad (18)$$

then yields the quadratic equation written as $$aS_n^2 + bS_n + c = 0 \quad (19)$$

where $$a = (F_n + X_n + E_n + H_n)(F_n + X_n + E_n), \quad (20)$$

$$b = \sigma^2[2(F_n + X_n + E_n) + H_n], \quad (20)$$

and $$c = \sigma^2\left(\sigma^2 - \frac{H_n}{\lambda}\right) \quad (22)$$

Solving the quadratic equation (19) using equations (20)–(22) is accomplished by first choosing a value for the Lagrange multiplier, $\lambda$. The power in each bin is then determined according to the quadratic equation (19). A check is then made to determine if the total power constraint defined by equation (14) is violated. If the total power constraint is not met, the Lagrange multiplier, $\lambda$, is readjusted and the process is repeated until the power constraint condition is met. When the power constraint condition is met, the power distribution in the EQPSD region is then also met. This process, however, requires that each $S_n$ be positive. It may, therefore, not always be possible to find a solution in the quadratic form. In these cases, the optimization process can be set up to include the inequality constraints set forth herein before, and then using the well-known Karush-Kuhn-Tucker (KKT) conditions to verify that each $S_n$ is positive.

Distribution of Power in the FDS Region

Waterfilling in the FDS region is done in a similar manner as described above for the EQPSD region. In this case however, since upstream and downstream signals are using disjoint frequency bands, self-NEXT is completely eliminated. Echo in this case is also not an issue, since FDS signaling is used. Determining optimal power distribution in this case can then begin by considering the equation for parallel Gaussian channels that is written as $$C = \sum_{n=1}^{N} \frac{W}{2N} \ln\left(1 + \frac{P_n H_n}{w_n + P_n F_n}\right), \quad (23)$$

and then proceeding in a manner similar to that described herein before in association with distribution of power in the EQPSD region.

With reference now to FIG. 20, a method is illustrated that employs the PSD estimation, sure-region computation and waterfilling techniques discussed herein before in order to determine the true optimal crossover point from EEQPSD to FDS signaling such that power can be distributed to achieve optimal channel capacity according to one embodiment of the present invention. The method begins by first setting up equispaced bins W (Hz) over the transmission bandwidth B of the channel as depicted in step 10. Next, the interference PSDs associated with noise, DSIN-NEXT and DSIN-FEXT are estimated and lumped into a single PSD as shown in step 12. Using the test conditions defined by equations (11) and (12), the sure-EQPSD region (all bins to the left of bin $M_E$) and the sure-FDS region are computed as depicted in step 14. Next, an initial estimate of the true optimal crossover point, $M_{E2F}$ is chosen as illustrated in step 16. Subsequent to the estimate of the true optimal crossover point, $M_{E2F}$, and initial estimate is made regarding the amount of power ($P_E$) that goes into the EQPSD region, and how much power ($P_F = P_{tot} - P_E$) goes into the FDS region as seen in step 18. With the foregoing information, use waterfilling techniques to distribute $P_E$ and $P_F$ optimally to compute overall channel capacity as depicted in step 20. Following optimal distribution of $P_E$ and $P_F$ to compute overall channel capacity, $P_E$ and $P_F$ are re-estimated as shown in step 22 and then used to again perform step 20. Steps 20 and 22 are the repeated for a range of powers in search of the maximum channel capacity as seen in step 24. Once the maximum channel capacity is found, $M_{E2F}$ is re-estimated and used to repeat steps 18–26 described herein above as shown by step 28. The bin number having the overall highest channel capacity as determined via steps 10–28 above is then selected as the true optimal crossover point $M_{E2F}$.

Figure 4A:
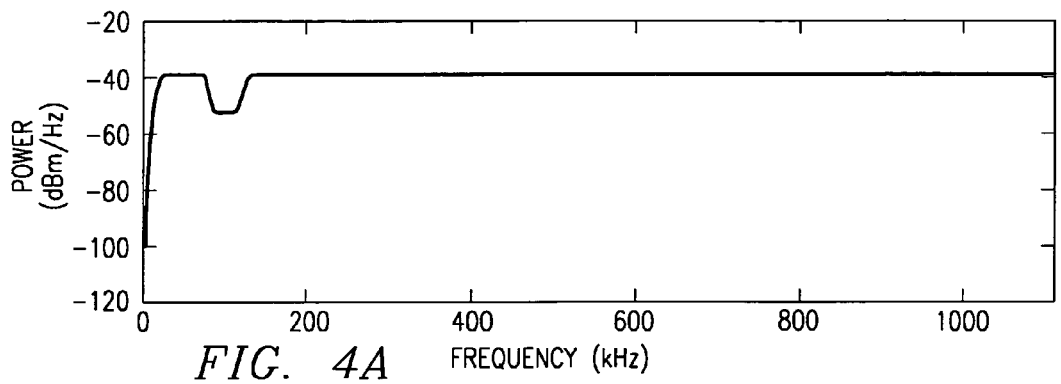
FIG. 4 illustrates a typical downstream PSD waveform and a typical upstream PSD waveform for a conventional ADSL system.
Figure 4B:
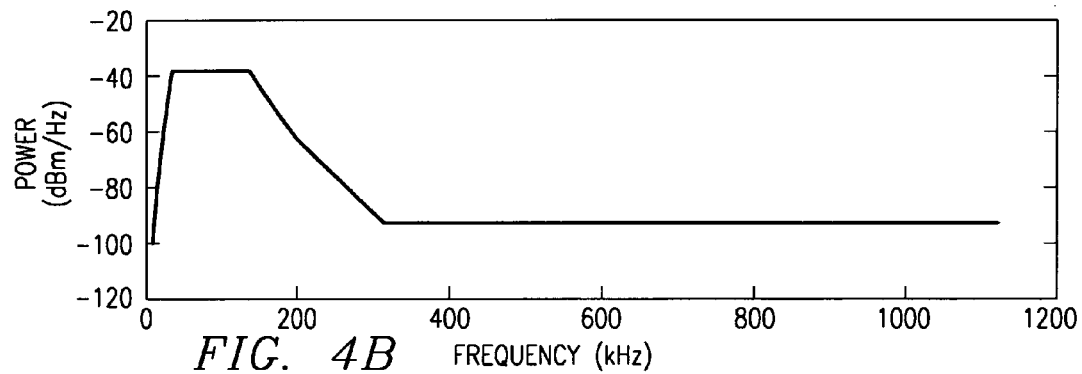
Figure 5A:
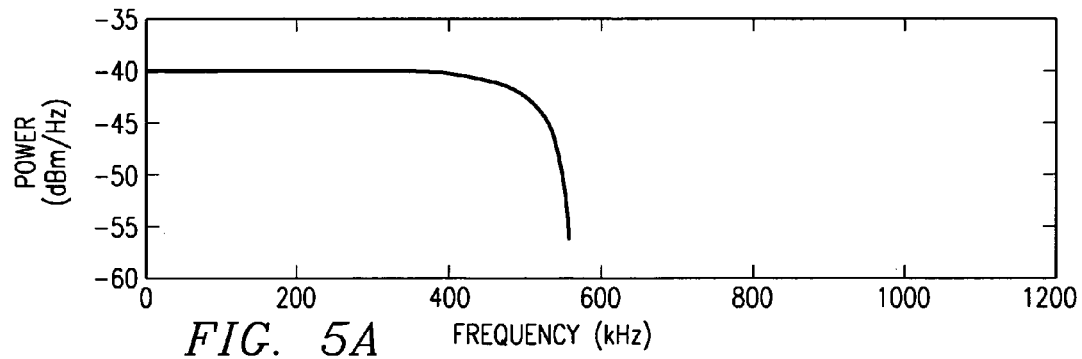
FIG. 5 illustrates optimal spectra obtained with 24 T1 NEXT interferers.
Figure 5B:
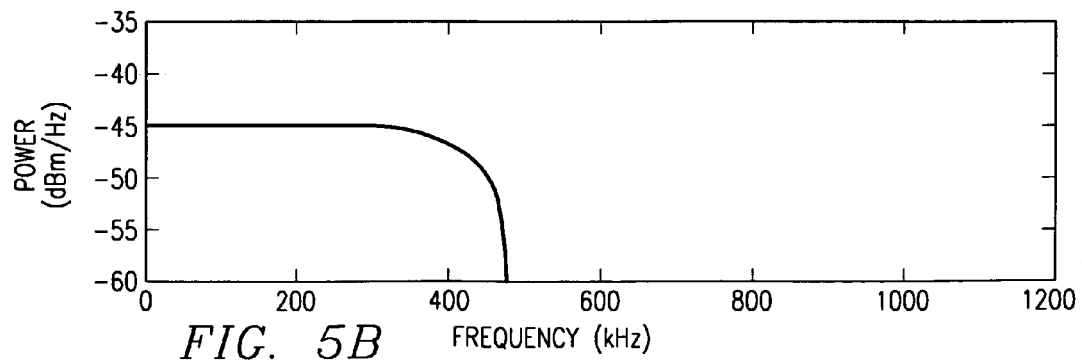
Figure 6A:
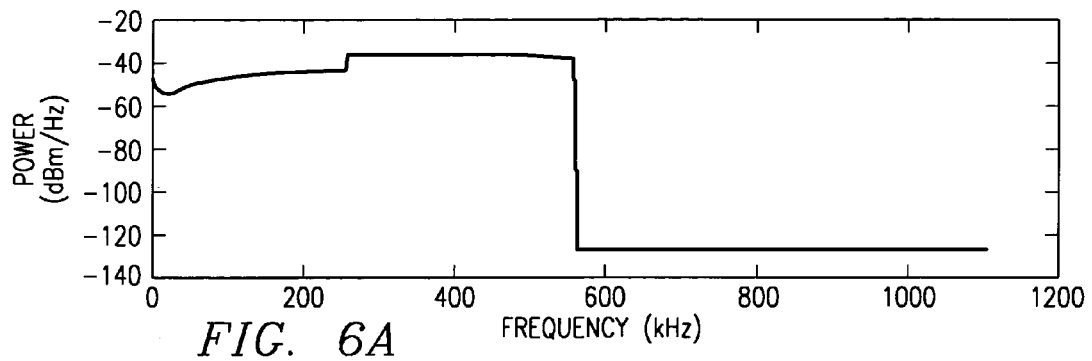
FIG. 6 illustrates optimal spectra obtained with 24 T1 NEXT and 24 self-NEXT interferers.
Figure 6B:
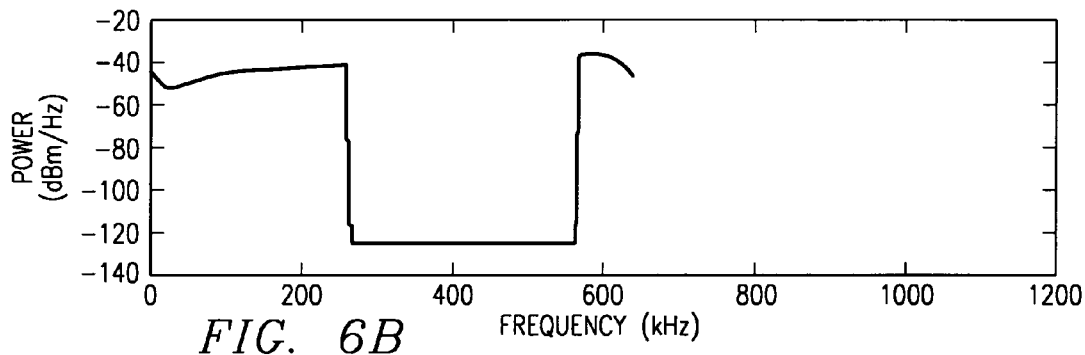
Figure 7A:
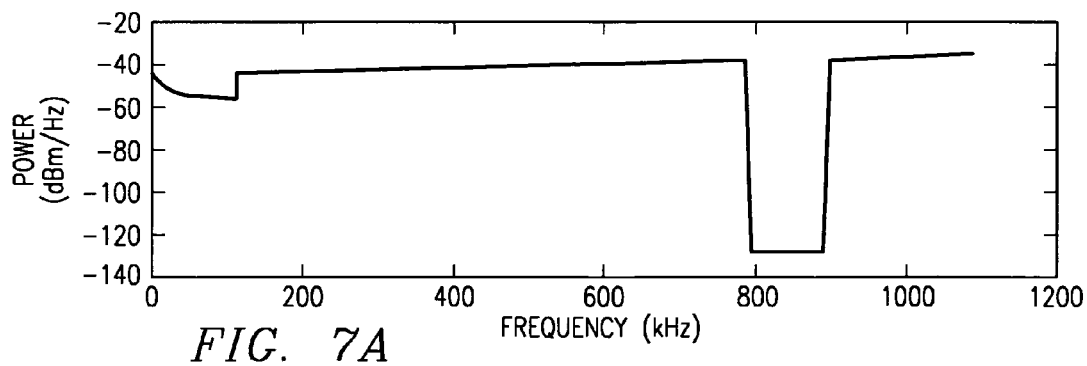
FIG. 7 illustrates optimal spectra obtained with 24 self-NEXT interferers.
Figure 7B:
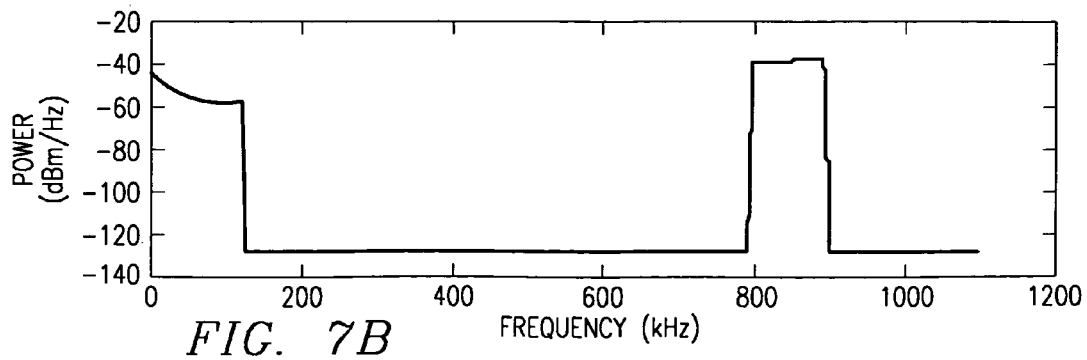
Figure 8A:
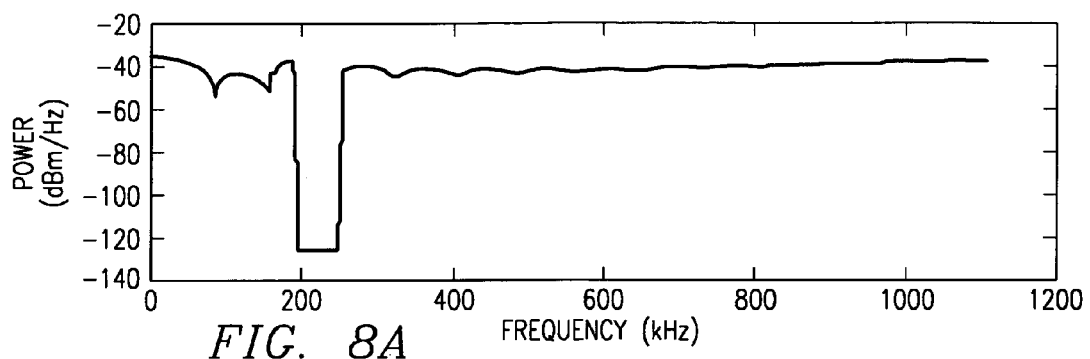
FIG. 8 illustrates optimal spectra obtained with 10 ISDN NEXT and 10 self-NEXT interferers.
Figure 8B:
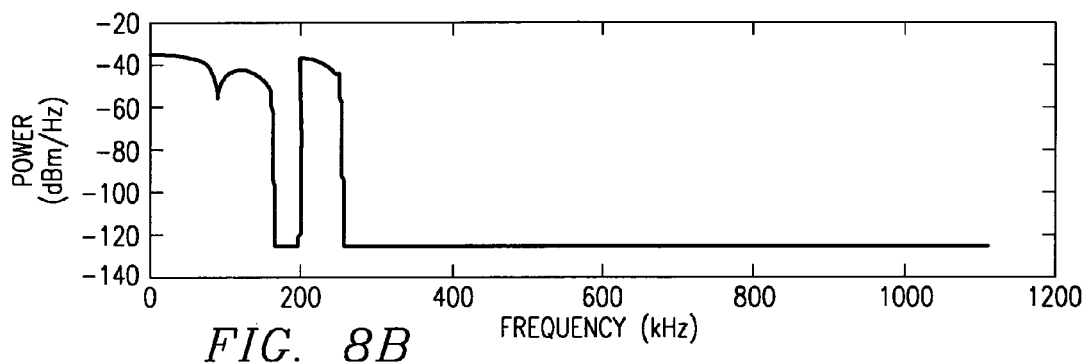

FIG. 4 simply illustrates a typical downstream PSD waveform and a typical upstream PSD waveform for a conventional ADSL system. As stated herein before, conventional ADSL systems use a fixed spectra that do not vary with noise and interference.

FIGS. 5–8 illustrate optimal spectra obtained for various interference combinations. It can be seen that the spectra are not unique. They vary significantly from one another, as the interference combination in each case differ.

Figure 9:
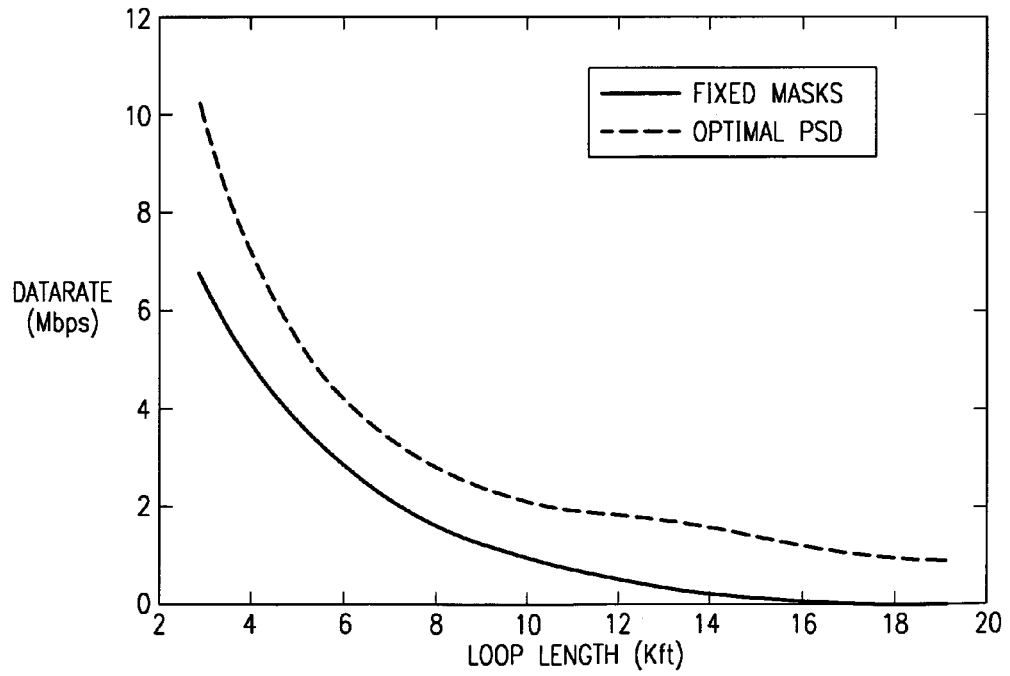
FIG. 9 illustrates the advantage optimal spectra have over fixed ones, as they employ knowledge of the noise environment when distributing power in the presence of 24 T1 NEXT and 24 self-NEXT interferers.
Figure 10:
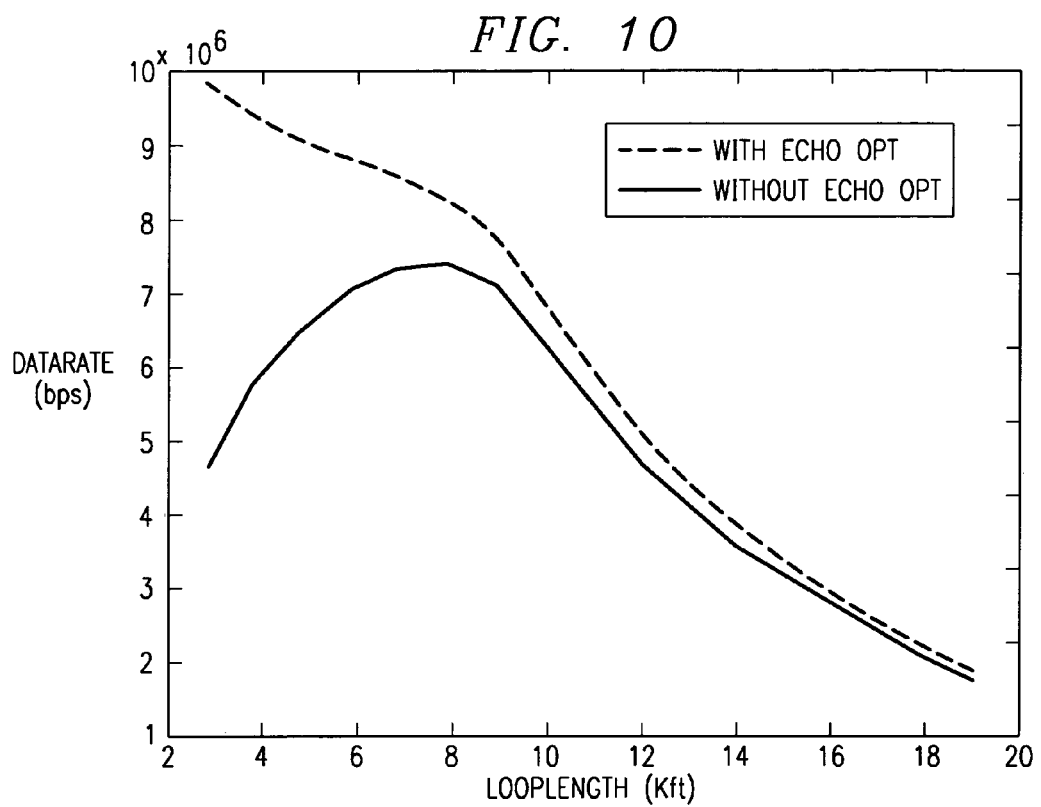
FIGS. 10–14 are graphs illustrating the differences in upstream and downstream data rate performance versus loop length between the present optimization method and one known method of spectral optimization in the presence of 39 self interferers.
Figure 11:
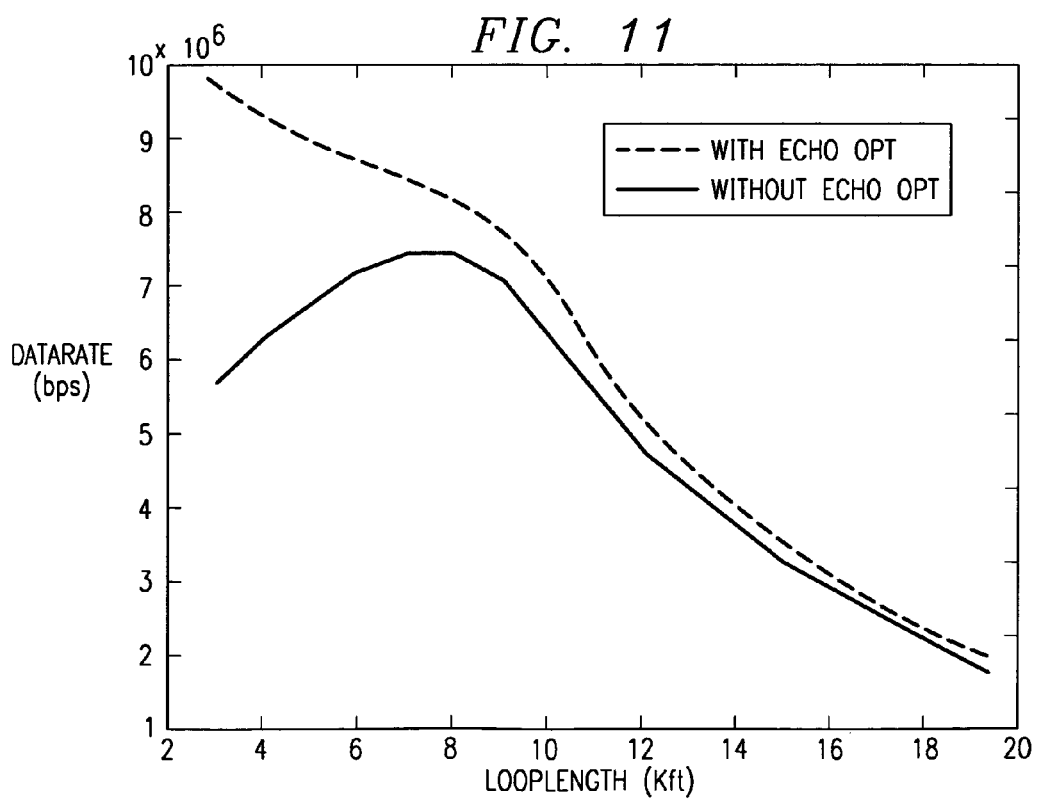
Figure 12:
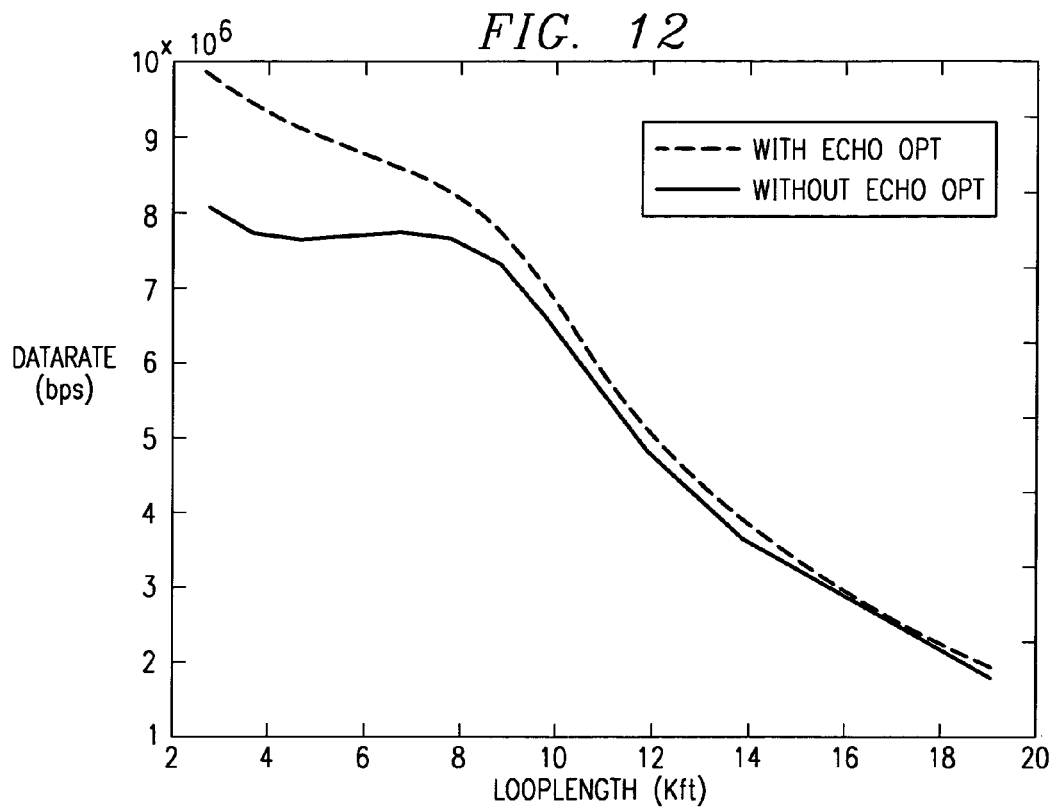
Figure 13:
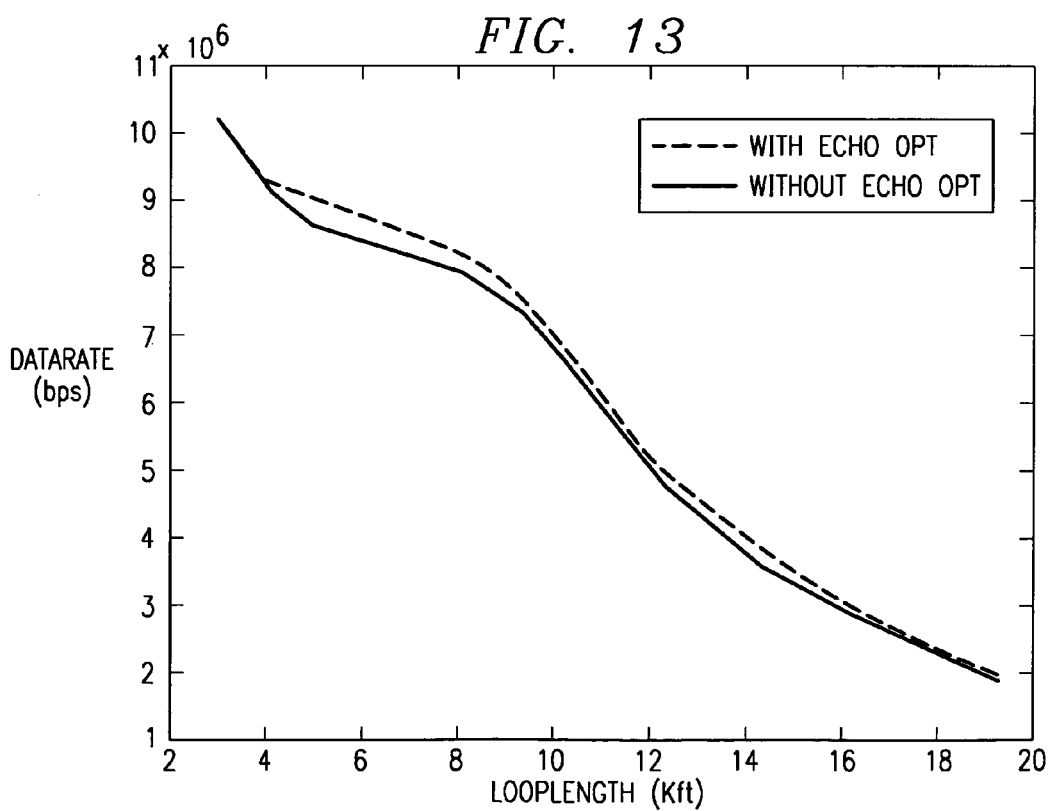
Figure 14:
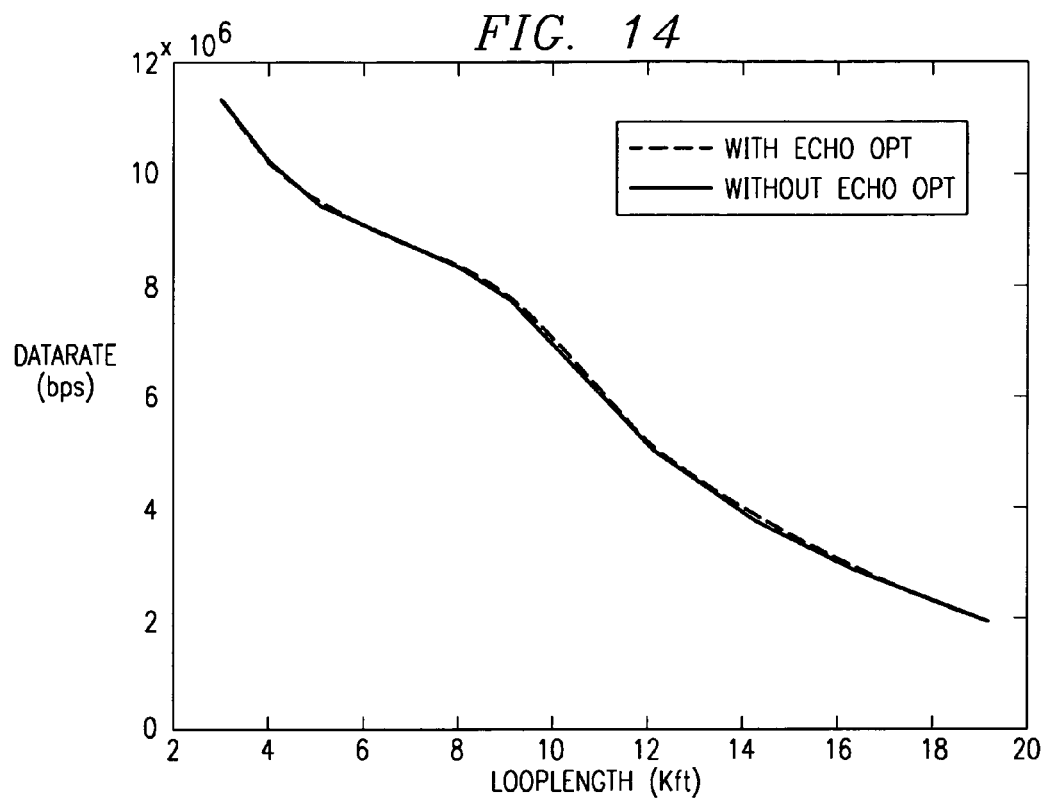
Figure 15:
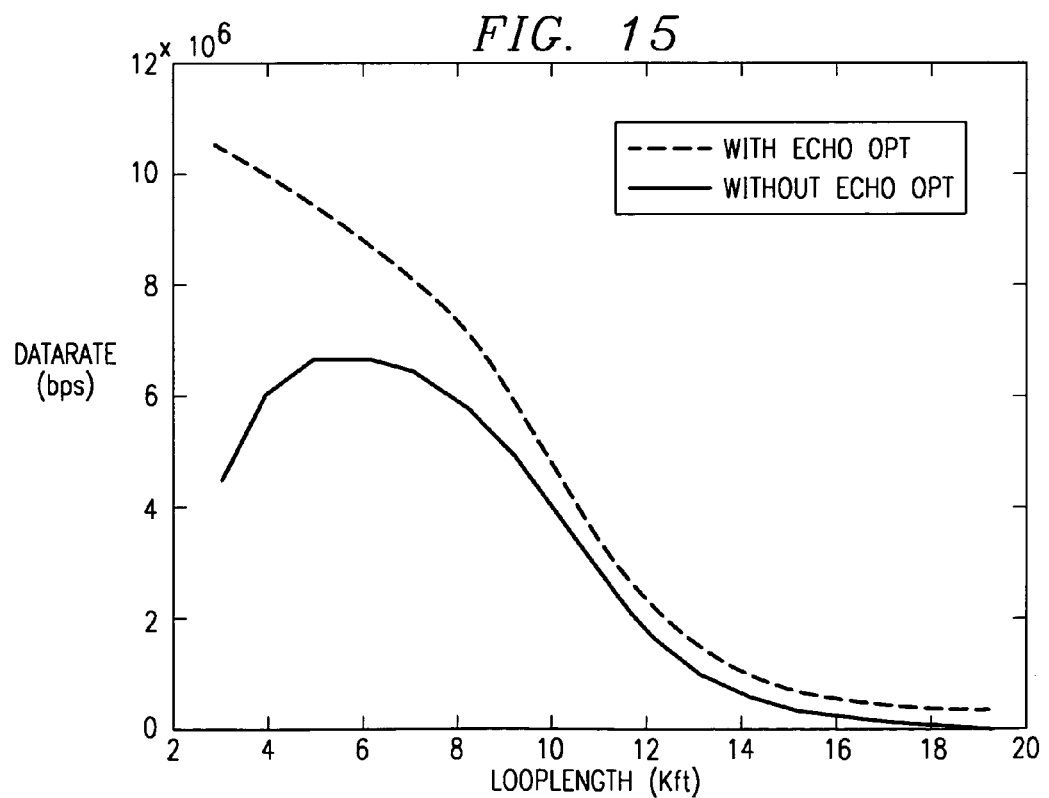
Figure 18:
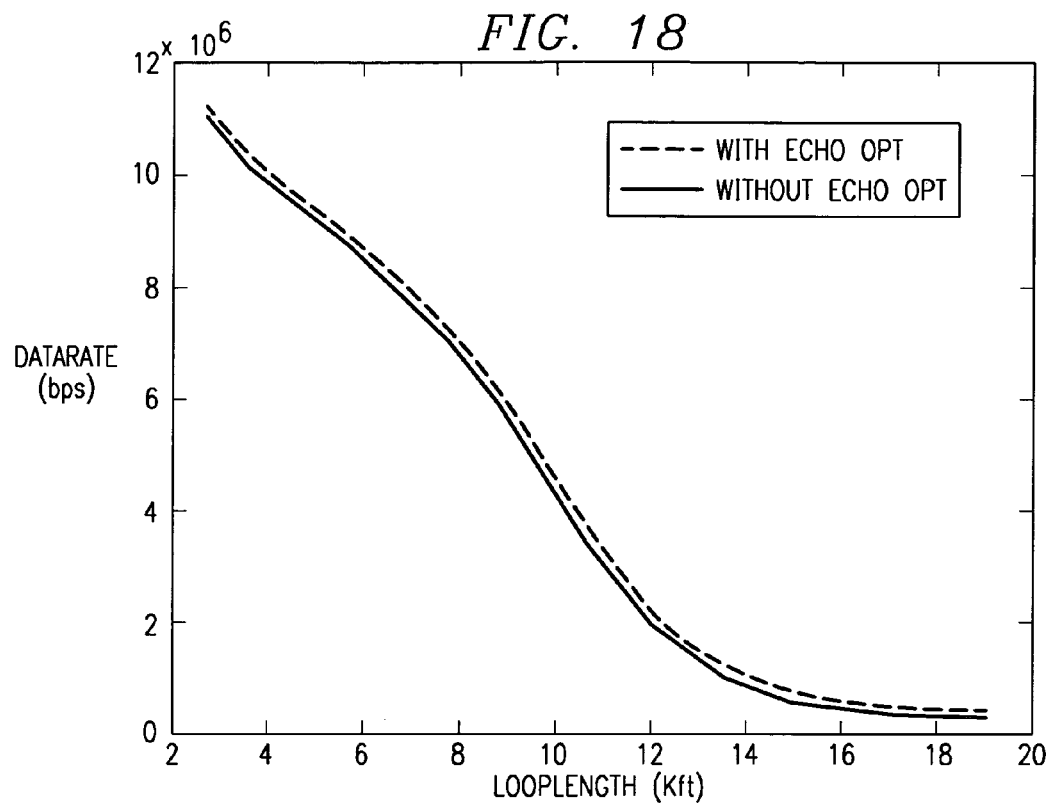
Figure 19:
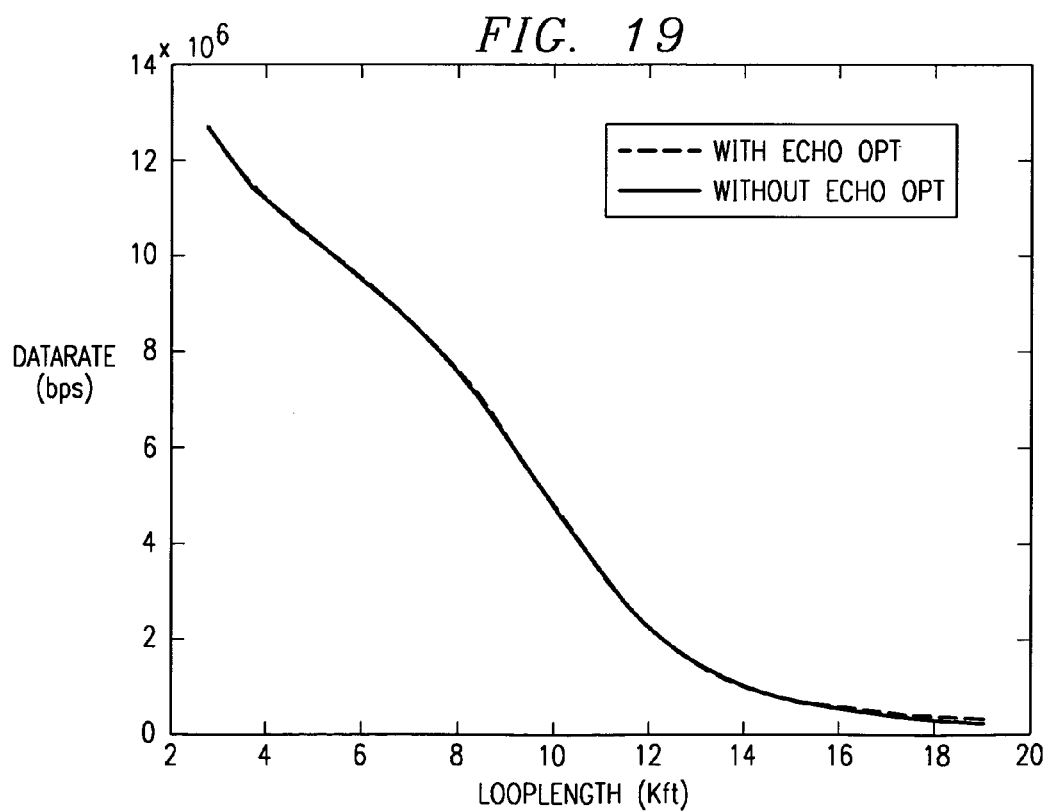

FIG. 9 illustrates the advantage optimal spectra have over fixed ones, as they employ knowledge of the noise environment when distributing power. Shown in this figure is the sum of upstream and downstream data rates achieved in the presence of 24 TI NEXT interferers and 24 self-NEXT interferers, when using the fixed spectra of FIG. 4 and the optimal spectra (for the instant case) shown in FIG. 6. It can be seen that a significant performance gain is achieved in terms of data rates using the joint optimization techniques discussed herein before.

FIGS. 10–19 are graphs illustrating the differences in upstream and downstream data rate performance versus loop length between the present optimization method and one known method of spectral optimization in the presence of crosstalk as disclosed by R. Gaikwad and R. Baraniuk, *Spectral optimization and joint signaling techniques for communication in the presence of crosstalk*, Tech. Rep. 9806, Rice University, Electrical and Computer Engineering Department, Houston, Tex., July 1998. The present inventors computed optimal spectra using the present method as well as the method taught by Gaikwad et al. The resulting optimal spectra were then tested in a realistic setting, by checking the performance of both systems using various values for the residual echo (after echo cancellation). The spectra of ADSL modems with 39 interferers was optimized for the first comparison. Table 1 illustrates the $M_{E2F}$ crossover point found by the optimization method discussed herein above. The last row of the table shows the values of $M_{E2F}$ that are achieved by the algorithm of Gaikwad et al, that does not factor in echo in the optimization process. FIGS. 10–14 are graphs illustrating the performance of the inventive optimization method discussed herein before as contrasted with the method of Gaikwad et al, and when factoring in imperfect equalization. The figures are seen to plot overall datarate (upstream and downstream) versus loop length, for values of residual echo ranging from 20 dB to 60 dB.

TABLE 1

Echo Cancelled to FDS crossover point for various loop lengths (Kft)

| Residual Echo (dB) | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|
| 20 | 0 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 0 | 0 | 0 | 0 | 0 |
| 40 | 0 | 0 | 0 | 0 | 0 | 0 | 0 | 0 | 0 | 0 | 0 | 0 | 0 | 0 | 0 | 0 | 0 |
| 50 | 95 | 40 | 0 | 0 | 0 | 0 | 0 | 0 | 0 | 0 | 0 | 0 | 0 | 0 | 0 | 0 | 0 |
| 60 | 113 | 71 | 44 | 24 | 12 | 5 | 0 | 0 | 0 | 0 | 0 | 0 | 0 | 0 | 0 | 0 | 0 |
| No echo opt | 114 | 73 | 48 | 30 | 19 | 13 | 10 | 8 | 6 | 5 | 4 | 4 | 3 | 2 | 2 | 2 | 2 |

A second comparison between the two methods was next performed. In this case, the present inventors optimized the spectra of ADSL modems with 10 self interferers and 10 HDSL NEXT interferers. Shown in Table 2 is the $M_{E2F}$ crossover point that the optimization routine discussed herein before yields. Again, the last row of the table shows the values of $M_{E2F}$ achieved by the method of Gaikwad et al., and when not factoring in echo in the optimization process. FIGS. 15–19 illustrates the performance of the optimization scheme discussed herein before versus the scheme of Gaikwad et al, when factoring in imperfect equalization. The figures can be seen to plot overall datarate (upstream and downstream) versus loop length, for values of residual echo ranging from 20 dB to 60 dB.

TABLE 2

Echo Cancelled to FDS crossover point for various loop lengths (Kft)

| Residual Echo (dB) | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|
| 20 | 0 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 0 | 0 | 0 | 0 | 0 |
| 40 | 0 | 0 | 0 | 0 | 0 | 0 | 0 | 0 | 0 | 0 | 0 | 0 | 0 | 0 | 0 | 0 | 0 |
| 50 | 95 | 54 | 44 | 39 | 32 | 22 | 0 | 0 | 0 | 0 | 0 | 0 | 0 | 0 | 0 | 0 | 0 |
| 60 | 133 | 83 | 62 | 55 | 51 | 49 | 46 | 45 | 46 | 51 | 48 | 13 | 7 | 3 | 2 | 0 | 0 |
| No echo opt | 136 | 88 | 66 | 58 | 54 | 52 | 49 | 48 | 47 | 49 | 27 | 22 | 19 | 16 | 13 | 10 | 8 |

In summary explanation, a power distribution scheme for optimization channel capacity significantly outperforms the scheme taught by Gaikwad et al., when the imperfect echo cancellation capabilities of practical xDSL systems are factored into the scheme. The reason for this is straightforward. Both optimization techniques choose between EQPSD and FDS signaling in a fashion that maximizes overall datarate. In regions where self-NEXT is high, capacity is greater by cutting the bandwidth in half, and using FDS signaling, rather by using the full bandwidth and using EQPSD signaling. Generally, the shorter the loop length, the smaller the effect of self-NEXT, and hence the less need for FDS signaling. The spectra of xDSL environments with shorter loop lengths are characterized by larger EQPSD regions than those with longer loop lengths. This is clearly seen by the data in the last rows of both Tables 1 and 2. It can also be clearly seen that generally, the EEQPSD to FDS crossover point occurs at higher tones for shorter loop lengths. Finally, it can be seen that when the echo becomes increasingly small, both techniques converge to the same spectra. This is due to the fact that echo has a smaller effect on system performance here, and does not adversely affect performance as much as it normally would in the EQPSD regions.

As shown herein before, the residual echo in the system acts in a manner similar to self-NEXT. When considering, for example, a region having low self-NEXT, but in which the echo is high (relative to signal power), this is similar to a region in which there is high self-NEXT for the present optimization scheme. As a result, rather than choosing EQPSD signaling (since there is low self-NEXT), the present optimization scheme chooses FDS signaling. The scheme taught by Gaikwad et al., however, does not factor in echo into the optimization process; and in the same situation, it sees a region with small self-NEXT and more inaccurately chooses EQPSD signaling. As demonstrated herein before, for shorter loop lengths, the performance of the scheme taught by Gaikwad et al. falls far from the scheme discussed herein in association with the present invention. This is because the echo cancelled region is much larger than it should be (hence the system sees much more echo noise).

Looking again at Tables 1 and 2, it can be seen that when the residual echo is less than 40 dB smaller than the signal power, the optimal spectra solely consist of an FDS region. The examples set forth herein before demonstrate that at 50 dB, an EQPSD region becomes noticeable using the present scheme (in reality, it becomes noticeable somewhere in between the 40 dB and 50 dB range). This transition point occurs when the residual echo becomes roughly the same magnitude as the self-NEXT transfer function (which for ADSL, at the frequencies close to zero is roughly $10^{-6}$). When the echo is much larger than this, it swamps out the self-NEXT and forces the system to choose an FDS solution. This observation is important since it provides some insight into system design. In situations, for example, when echo canceller performance is poor enough to swamp out the self-NEXT transfer function, an FDS solution would almost entirely be seen. In this situation then, it would not make sense to include the extra hardware on the modem for echo cancellation capability (when it would not provide any increased gain performance to the system), therefore providing reduced system costs. The optimal solution for this situation is simply the modified waterfilling solution described herein before (rather than the fixed PSD masks used by present systems).

In view of the foregoing discussion of the preferred embodiments of the optimal power distribution methods in the presence of crosstalk and imperfect echo cancellation, it can be seen that knowledge of the optimal solution when factoring echo canceller performance is of great use. When echo canceller performance is poor and the echo swamps out the self-NEXT transfer function, for example, an FDS solution results exclusively, and has significantly better performance than a combined EQPSD and FDS solution that would result using the scheme taught by Gaikwad et al. This knowledge can then be used to implement systems that do not have an echo canceller if it is known that echo rejection would be poor. In situations when echo rejection is moderate (i.e. the residual echo is roughly the same order of magnitude as self-NEXT), the present technique provides a solution using both EQPSD and FDS signaling. This solution also provides better performance than that provided using the scheme of Gaikwad et al., as it used EQPDS signaling more sparingly to keep echo noise limited, while still using EQPSD enough to maximize capacity. The optimization techniques set forth herein before in association with particular embodiments of the present invention, function with excellent echo canceller performance to provide a solution that converges to the same as that provided by the Gaikwad et al. scheme, which is expected as the effect of echo becomes increasingly negligible.

In view of the above, it can be seen the present invention presents a significant advancement in the art of power distribution methods for communication systems. Further, this invention has been described in considerable detail in order to provide those skilled in the xDSL and wireless communication arts with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of distributing power over a communication channel, the method comprising the steps of:
   (a) dividing the communication channel into a fixed number of equal bandwidth bins;
   (b) estimating total channel interference contributed by noise, DSIN-NEXT and DSIN-FEXT and lumping the estimated total channel interference into one power spectral density (PSD);
   (c) determining a sure-EQPSD signaling region and a sure-FDS signaling region for the communication channel;
   (d) estimating a true optimal crossover point for switching between EQPSD signaling and FDS signaling;
   (e) estimating an initial power distribution of power, $P_E$, on one side of the estimated true optimal crossover point (EQPSD region), and $P_F$, on the other side of the estimated true optimal crossover point (FDS region);
   (f) distributing optimally the power on each side of the estimated true optimal crossover point;
   (g) determining overall communication channel capacity;
   (h) re-estimating the initial power distribution of power on each side of the estimated true optimal crossover point;
   (i) repeating steps (g) and (h) for a desired range of powers to determine a maximum communication channel capacity;
   (j) re-estimating the true optimal crossover point for switching between EQPSD signaling and FDS signaling;
   (k) repeating steps (e)–(j) for a desired range of values of the true optimal crossover point; and
   (l) selecting a highest channel capacity bin as the true optimal crossover point.

2. The method according to claim 1 wherein the step (f) of distributing optimally the power on each side of the estimated true optimal crossover point comprises distributing FDS power on one side of the estimated true optimal crossover point and distributing EQPSD signaling power on an opposite side of the estimated true optimal crossover point.

3. The method according to claim 1 wherein the step (f) of distributing optimally the power on each side of the estimated true optimal crossover point comprises waterfilling the EQPSD region as a function of subchannel input power, subchannel power transfer gain, subchannel self-NEXT, subchannel self-FEXT and subchannel echo.

4. The method according to claim 1 wherein the step (f) of distributing optimally the power on each side of the estimated true optimal crossover point comprises waterfilling the FDS region as a function of subchannel input power, subchannel power transfer gain, and subchannel self-FEXT.

5. The method according to claim 1 wherein the step (1) of selecting a highest channel capacity bin as the true optimal crossover point comprises selecting a bin having the highest data rate.

6. The method according to claim 1 wherein the step (c) of determining a sure-EQPSD signaling region and a sure-FDS signaling region for the communication channel comprises finding a single stationary point and using EQPSD signaling for upstream and downstream signal transmission when the single stationary point is a maximum and alternatively using FDS signaling for upstream and downstream signal transmission when the single stationary point is a minimum.

* * * * *